US007436833B2

(12) United States Patent
Jimmei

(10) Patent No.: US 7,436,833 B2
(45) Date of Patent: Oct. 14, 2008

(54) COMMUNICATION SYSTEM, ROUTER, METHOD OF COMMUNICATION, METHOD OF ROUTING, AND COMPUTER PROGRAM PRODUCT

(75) Inventor: Tatsuya Jimmei, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 621 days.

(21) Appl. No.: 11/180,586

(22) Filed: Jul. 14, 2005

(65) Prior Publication Data
US 2006/0018317 A1  Jan. 26, 2006

(30) Foreign Application Priority Data
Jul. 15, 2004 (JP) ............................... 2004-208429

(51) Int. Cl.
*H04L 12/56* (2006.01)
(52) U.S. Cl. .................................. 370/389; 370/395.52
(58) Field of Classification Search ........................ None
See application file for complete search history.

(56) References Cited

U.S. PATENT DOCUMENTS

| 2004/0107234 A1* | 6/2004 | Rajahalme ................. 709/200 |
| 2004/0146045 A1* | 7/2004 | Jimmei et al. ............... 370/351 |
| 2004/0205211 A1* | 10/2004 | Takeda et al. ............... 709/230 |

FOREIGN PATENT DOCUMENTS

| JP | 11-177622 | 7/1999 |
| JP | 2000-349747 | 12/2000 |
| JP | 2002-512487 | 4/2002 |
| JP | 2004-166002 | 6/2004 |

OTHER PUBLICATIONS

Metz, IP Anycast Point-to-(Any) Point Communications, IEEE, 5 pages, Apr. 2002.*
Weber et al, A Survey of Anycast in IPv6 Networks, IEEE, 6 pages, Jan. 2004.*
Doi et al, Protocol Design for Anycast Communications in IPv6 Network, IEEE, 4 pages 2003.*
Deering, S. et al., "RFC2460," Internet Protocol, Version 6 (IPv6) Specification, pp. 1-20, (Dec. 1998).
Hinden, R. et al., "IETF RFC3513," IP, Version 6 Addressing Architecture, pp. 1-13, (Jul. 1998).
Office Action issued by the Japanese Patent Office on May 22, 2007, for Japanese Patent Application No. 2004-208429, and partial English translation thereof.

* cited by examiner

Primary Examiner—Frank Duong
(74) Attorney, Agent, or Firm—Finnegan, Henderson, Farabow, Garrett & Dunner, L.L.P.

(57) ABSTRACT

A communication system includes a server and a router which are both connected to a first network. The server grants to a response packet destined for an anycast address sent from a communication apparatus connected to a second network, anycast address option information indicating that an anycast address of a sender of the response packet, puts a signature field for a setting of an electronic signature in the response packet; and transmits to the communication apparatus the response packet. The router receives the response packet, validates whether the response packet is sent from a legitimate server based on the anycast address option information if the response packet includes the anycast address option information. The router also sets an electronic signature based on information related with the response packet in the signature field if the response packet is sent from the legitimate server, and transmits the response packet.

19 Claims, 11 Drawing Sheets

| ANYCAST ADDRESS | UNICAST ADDRESS |
|---|---|
| xxxx:0:0:0:8:800:yyyy:zzzz | 1080:0:0:0:8:800:200C:417A |
|  | 1080:0:0:0:8:800:200C:433B |
|  | 1080:0:0:0:8:800:210A:200A |
|  | ... |
| xxxx:0:0:0:8:500:yyyy:zzzz | 1080:0:0:0:8:500:100C:314A |
|  | 1080:0:0:0:8:500:130A:200A |
|  | 1080:0:0:0:8:500:330B:516B |
|  | ... |
| ... | ... |

COMMUNICATION SYSTEM, ROUTER, METHOD OF COMMUNICATION, METHOD OF ROUTING, AND COMPUTER PROGRAM PRODUCT

CROSS-REFERENCE TO RELATED APPLICATIONS

This application is based upon and claims the benefit of priority from the priority Japanese Patent Application No. 2004-208429, filed on Jul. 15, 2004; the entire contents of which are incorporated herein by reference.

BACKGROUND OF THE INVENTION

1. Field of the Invention

The present invention relates to a communication system, a router, a method of communication, a method of routing and a computer program product that prevent a response packet alteration through impersonation in a network environment where IPv6 anycast address is employed.

2. Description of the Related Art

In recent years, a mainstream IP address format for the Internet is shifting from IPv4 which is an addressing architecture with 32-bit length to IPv6 (Internet Protocol, Version 6) which is an addressing architecture with 128-bit length. One feature of the IPv6 addressing architecture is an introduction of an "anycast address." The anycast address is, as defined in IETF RFC2460 Internet Protocol, Version 6 (IPv6) Specification, an address allocated to plural interfaces on plural nodes dissimilar to the unicast address, though the anycast address is utilized similarly to the unicast address in terms of routing.

Hence, when a packet is sent from a certain node to an anycast address, the packet is sent to a nearest node with this anycast address on the route. Even if the nearest node with the anycast address encounters some problems on receiving the packet, once the routing information is gathered, the packet can be automatically be sent to a second best node to which the same anycast address has been allocated. Such feature of the anycast address can be utilized to provide a high-redundancy service. For example, if a known anycast address is allocated to plural servers that provide a predetermined service, such service can be supplied with high redundancy without any particular setting or modification of an end-host.

In a field of the Internet communication, security is a pressing issue to prevent attacks from an illegitimate node impersonating a legitimate node. For example, in the service provision using the unicast address, a communication apparatus which is a client in the network can compare a destination address of an inquiry packet and a sender's address of a packet responding thereto to find out-whether the two addresses match. On finding out that the two do not match, the client can determine that the received packet is sent from a fake node thereby prevent the malicious attack from a fake node impersonating a legitimate node.

On the other hand, the malicious fake node may set a proper sender's address in an IP header disguising a true identity. To deal with such an attack, one can reduce a exposure to the attack to a certain degree by a filtering, for example, by validating a sender's address at a router provided on a site border, not only by validating a sender's address at the client's side.

According to the IPv6, however, the anycast address cannot be set in the sender's address field in the IP header. When the server receives a packet destined for an anycast address from a client communication apparatus, the server needs to set server's own unicast address in the sender's address field in the IP header of a response packet in order to send the response packet to the client communication apparatus.

Thus, in general, the utilization of the anycast address implies increased likelihood of attacks through impersonation by malicious nodes.

Assume that an anycast address is allocated to the server, and the client communication apparatus sends an inquiry packet destined for the anycast address to the server. Here, the client communication apparatus cannot know the server's unicast address in advance, and is unable to validate if the unicast address set in the sender's address field in the IP header of the response packet is a correct address of the legitimate server. Then, the client communication apparatus cannot take any measures but accept response packets with any sender's address.

Thus, when the communication apparatus sends an inquiry packet to the server using the anycast address, a fake node impersonating the legitimate server can send back a fake response packet without using a legitimate sender's address for the response packet. Therefore the communication using the anycast address is more immune to attacks by impersonation of malicious nodes than the communication using the unicast address. In addition, in the communication using the anycast address, the legitimacy of the sender node is difficult to validate.

Further, even when the filtering is performed to validate the legitimacy of the sender's address, it is difficult to prevent the attack from a malicious node inside the site since the site boundary also demarcates the filtering area.

SUMMARY OF THE INVENTION

According to one aspect of the present invention, a communication system includes a server and a router which are both connected to a first network. The server includes an option setting unit that grants to a response packet that is a response to a packet which is destined for an anycast address and which is sent from a communication apparatus connected to a second network different from the first network, anycast address option information which indicates that an anycast address is allocated to a sender of the response packet; a field putting unit that puts a signature field for a setting of an electronic signature in the response packet; and a transmitting unit that transmits to the communication apparatus the response packet in which the anycast address option information has been set and the signature field has been put. The router includes a receiving unit that receives the response packet sent from the server to the communication apparatus; a sender validating unit that validates whether the response packet is sent from a legitimate server based on the anycast address option information if the response packet includes the anycast address option information; a validation information setting unit that sets an electronic signature based on information related with the response packet in the signature field put in the response packet, when the response packet is validated to be sent from the legitimate server; and a transferring unit that transmits the response packet in which the electronic signature has been set.

According to another aspect of the present invention, a router includes a receiving unit that receives a response packet from a server connected to a first network to a communication apparatus connected to a second network different from the first network, the response packet being a response to a packet destined for an anycast address which is sent from the communication apparatus and which is received by the server; a sender validating unit that validates whether the response packet is sent from a legitimate server based on anycast address option information which indicates that an anycast address is allocated to a sender of the response packet if the response packet includes the anycast address option information; a validation information setting unit that, when the response packet is validated to be sent from the legitimate server, sets an electronic signature based on information related with the response packet in the signature field put in the response packet; and a transferring unit that transfers the response packet in which the electronic signature is set to a next node.

According to still another aspect of the present invention, a communication method includes, in a server connected to a first network, granting to a response packet that is a response to a packet which is destined for an anycast address and which is sent from a communication apparatus connected to a second network different from the first network, anycast address option information which indicates that an anycast address is allocated to a sender of the response packet; in the server, putting a signature field for a setting of an electronic signature in the response packet; and in the server, transmitting to the communication apparatus the response packet in which the anycast address option information has been set and the signature field has been put. The communication method also includes, in a router connected to the first network, receiving the response packet sent from the server to the communication apparatus; in the router, validating whether the response packet is sent from a legitimate server based on the anycast address option information if the response packet includes the anycast address option information; in the router, setting an electronic signature based on information related with the response packet in the signature field put in the response packet, when the response packet is validated to be sent from the legitimate server; and in the router, transferring the response packet in which the electronic signature has been set.

According to still another aspect of the present invention, a routing method includes receiving a response packet from a server connected to a first network to a communication apparatus connected to a second network different from the first network, the response packet being a response to a packet destined for an anycast address which is sent from the communication apparatus and which is received by the server; determining whether the received response packet includes anycast address option information which indicates that an anycast address is allocated to a sender of the response packet; if the response packet includes the anycast address option information, validating whether the response packet is sent from a legitimate server based on the anycast address option information; setting an electronic signature based on information related with the response packet in the signature field put in the response packet, when the response packet is validated to be sent from the legitimate server; and transferring the response packet in which the electronic signature is set to a next node.

A computer program product according to still another aspect of the present invention causes a computer to perform the method according to the present invention.

DETAILED DESCRIPTION OF THE PREFERRED EMBODIMENTS

Figure 1:
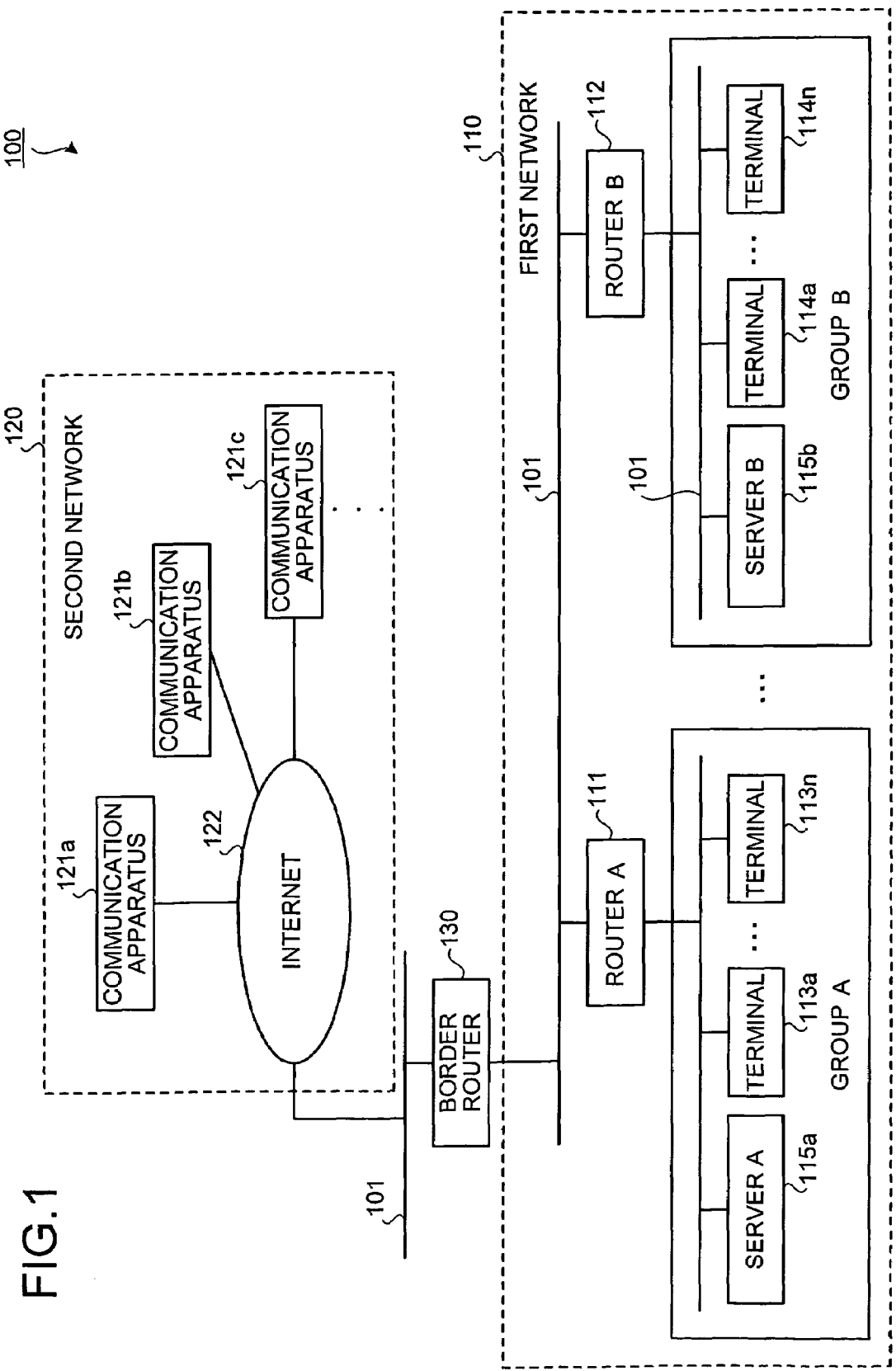
FIG. 1 is a block diagram of a network structure of a communication system according to a first embodiment.

FIG. 1 is a block diagram of a network structure of a communication system according to a first embodiment. A communication system 100 according to the first embodiment, as shown in FIG. 1, includes communication apparatuses 121a, 121b, and 121c in a second network 120, and a border router 130. The communication system further includes a router A111, a router B112, a server A115a, terminals 113a-113n, a server B115b, and terminals 114a-114n in a first network 110 which is an internal network. The first network 110 and the second network 120 are connected via an internet 122. Here, the internet 122 may be provided by a dedicated line connected by lines such as a cable, a long-distance wireless communication such as a satellite communication, a short-distance wireless communication such as BlueTooth, or the like.

The routers A111 and B112 are apparatuses which search an appropriate route for packet transmission on a network layer, i.e., perform routing, and in charge of data transfer between every node in the first network 110.

The router A111 is connected to lower nodes such as the server A115a, the terminals 113a-113n. The router B112 is connected to lower nodes such as the server B115b, the terminals 114a-114n. All elements in the first network 110 are connected via a Local Area Network (LAN) cable 101.

The server A115a is a computer which resides at a center of the nodes that are under the control of the router A111 and performs processing. The server B115b is a computer which resides at a center of the nodes that are under the control of the router B112 and performs processing.

To an interface of every element, an IP address in the IPv6 format is allocated as an interface address. In the first embodiment, the physical layer of the LAN cable 101 is Ethernet (registered trademark), in which an IP address of IPv6 format is allocated.

Each IP address includes a 64-bit interface identifier generated from a media access control (MAC) address which is previously allocated to each interface. Eventually, a 128-bit address is automatically generated so as to include the interface identifier as a lower 64 bits and a prefix sent from a router as an upper 64 bits.

The IP address in the IPv6 format can be classified into different types such as a link local address or a global address. In the first embodiment, the IP address is a global address.

A manager of a lower network that belongs to the border router 130 grants a same anycast address S to the interface of the server A115a and the interface of the server B115b. A packet destined for an anycast address is sent to a nearest interface with the anycast address on the route.

In the communication system 100 according to the first embodiment, the nearest server from the border router 130 having the anycast address S is the server A115a.

The routers A111 and B112 grasp whether the lower nodes have anycast addresses or not with the use of an anycast address correspondence table. For example, the router A111 stores an anycast address correspondence table which indicates that the anycast address S is allocated to the server A115a. Similarly, the router B112 stores an anycast address correspondence table which indicates that the anycast address S is allocated to the server B115b.

The anycast address correspondence tables may be manually set by the manager, or may be configured to be automatically set by a protocol previously determined between the router and the server.

Figure 2:
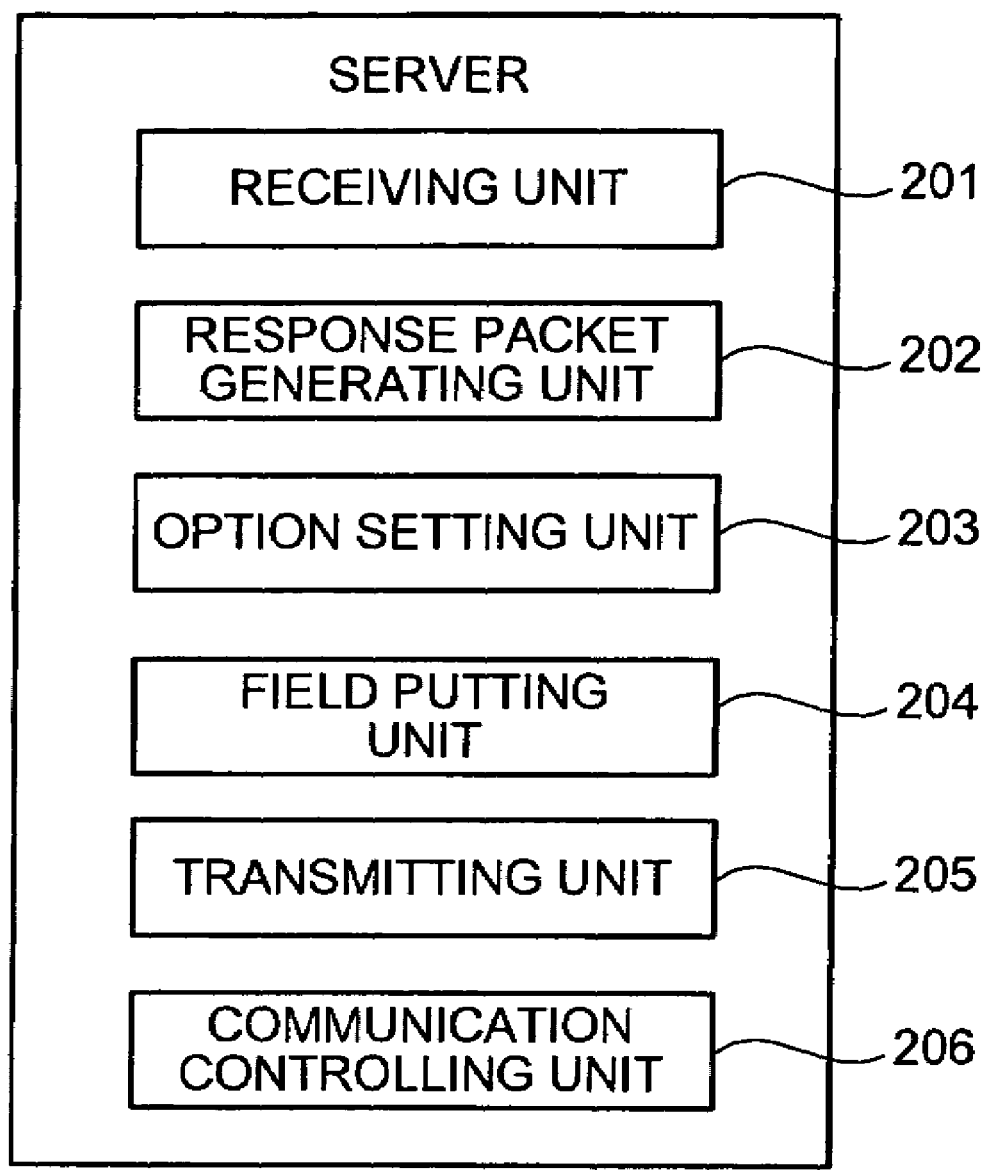
FIG. 2 is a block diagram of a schematic structure of servers A115a and B115b.

The servers A115a and B115b are described. FIG. 2 is a block diagram of a schematic structure of the servers A115a and B115b. The server A115a and the server B115b have the same schematic structure.

As shown in FIG. 2, the servers A115a and B115b each mainly include a receiving unit 201, a response packet generating unit 202, an option setting unit 203, a field putting unit 204, a transmitting unit 205, and a communication controlling unit 206.

The servers A115a and B115b according to the first embodiment have the allocated anycast address S. When the communication apparatuses 121a, 121b, and 121c in the second network 120 send a packet to the anycast address S, the packet is transmitted to the nearest server from the border router 130.

The receiving unit 201 is a processor which receives a packet addressed to the anycast address S sent from the communication apparatus 121a, 121b, 121c, or the like.

The response packet generating unit 202 is a processor which generates a response packet when the receiving unit 201 receives a packet to respond to the sender of the packet. The response packet generating unit 202 generates a response packet in the IPv6 format, and is capable of setting a unicast address of the server itself in the sender's address field of the IPv6 header in the response packet. According to the restraint by the IPv6, the anycast address cannot be set as the sender's address.

The option setting unit 203 sets a Hop-by-Hop option in an IPv6 extension header, and sets the allocated anycast address to indicate whether the anycast address is allocated to the server or not. The Hop-by-Hop option is additional information to be processed at every node to be hopped.

Figure 3:
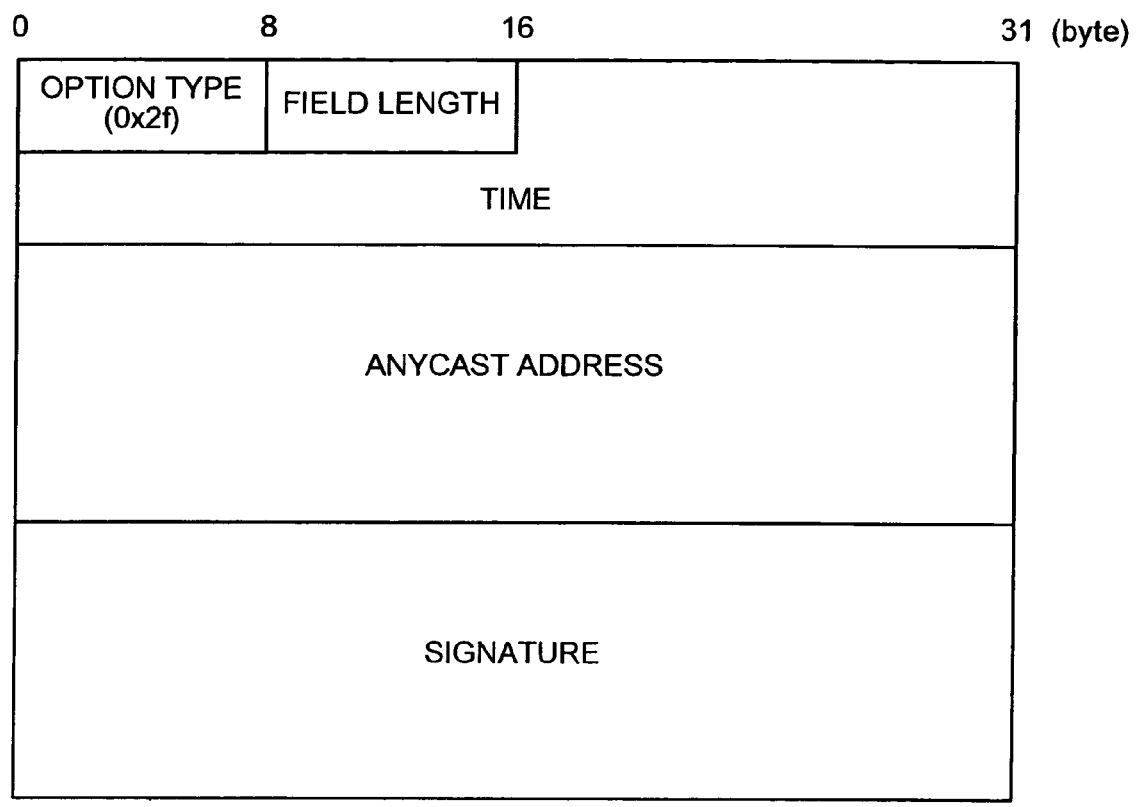
FIG. 3 is a schematic diagram of a data structure of a Hop-by-Hop option.

FIG. 3 is a schematic diagram of a data structure of the Hop-by-Hop option. As shown in FIG. 3, the Hop-by-Hop option includes an option type, a field length, a time field, an anycast address field, and an electronic signature field.

The field of the option type and the field length are 8 bits each and 16-bit length in total. These are fixed fields in the IPv6 options. In the first embodiment, the option type is described in hexadecimal digits as "0x2f." The value is "0011111" when expressed in binary digits. Since the first three bits are "001," it can be understood that the router which cannot understand such option should ignore the option, and that the contents of the Hop-by-Hop option may be rewritten by the router during transmission.

In the first embodiment, the router sets an electronic signature in the electronic signature field, and a time of a first transfer of the response packet in the time field. Hence, it is prerequisite that the contents of the Hop-by-Hop option are to be rewritten by the router during transmission. However, the condition that the router which cannot understand the option should ignore the same is not always necessary. For example, if all the router, the server, and the communication apparatus are to perform validation using the Hop-by-Hop option, it may be possible to set an option so that a node which does not recognize the Hop-by-Hop option can discard the packet.

The latter five bits in the option type indicates a specific option. In FIG. 3, the value is shown as "11111" (binary digits). This option value indicates that the Hop-by-Hop option is used as an anycast address option which indicates that the response packet is from the node having an allocated anycast address. In the first embodiment, the Hop-by-Hop option is configured so as to indicate the anycast address option with the latter five bits "11111" in the option type field. However, any value can be set as to indicate the same as far as the value can uniquely identify the option.

The field length indicates the length of the entire Hop-by-Hop option. In the first embodiment, the Hop-by-Hop option has a fixed length, which is 38 byte when a first 16 bits (2 bytes) are excluded. Thus, the value set in the field length field is 38.

The time field is of 6-byte length (48 bits) and in which a time of transfer of the response packet is set by the router which first transfers the response packet.

The anycast address field is of 16-byte length (128 bits) and in which the anycast address allocated to the sender server A115a or B115b is set by each server.

The signature field is of 16-byte length (128 bits) and in which an electronic signature generated by the router with the use of a secret key is set for the Hop-by-Hop option in which the anycast address is set.

Here, each field length of the time field and the signature field is not limited to the example shown in FIG. 3. In addition, the signature field may be of variable length, and then a field indicating the field length of the signature field may be set in front of the signature field.

Return to FIG. 2, the field putting unit 204 performs processing to put the time field and the signature field in the Hop-by-Hop option which is set by the option setting unit 203 in the extension header of the response packet. The time field is a field where the time of receipt of the response packet is set by the router which receives the response packet. The signature field is a field where the electronic signature is set for the Hop-by-Hop option of the response packet in which the anycast address is set. The electronic signature is generated with the use of a secret key by the router that receives the response packet.

The transmitting unit 205 transmits the response packet to the communication apparatus that makes the inquiry. In the response packet, the time field, the signature field or the like are securely provided by the option setting unit 203.

The communication controlling unit 206 generates a control signal to transmit/receive data to/from the router, the server or the like via the communication line. In particular, the communication controlling unit 206 corresponds to a network board or the like.

Figures 4, 5:
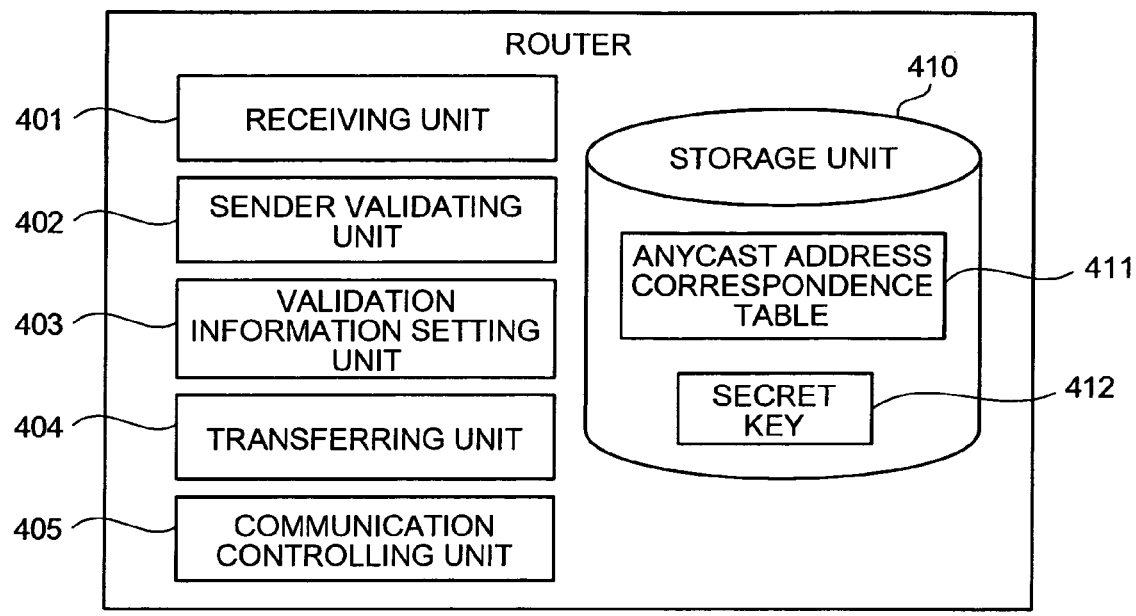
FIG. 4 is a block diagram of a schematic structure of routers A111 and B112.
FIG. 5 is a schematic diagram of an example of an anycast address correspondence table 411.

Next, the routers A111 and B112 in the first network 110 are described. FIG. 4 is a block diagram of a schematic structure of the routers A111 and B112. The router A111 and the router B112 have the same schematic structure.

As shown in FIG. 4, the router A111 and the router B112 each have a receiving unit 401, a sender validating unit 402, a validation information setting unit 403, a transferring unit 404, a communication controlling unit 405, and a storage unit 410.

The receiving unit 401 is a processor that receives a packet transmitted from other apparatus such as the server A115a or the server B115b in the network. In the first embodiment, the receiving unit 401 serves to receive a response packet sent from the servers A115a and B115b to transfer the same to the communication apparatuses 121a, 121b, and 121c.

The sender validating unit 402 performs processing to validate whether the received response packet is sent from a legitimate server or not. Specifically, the sender validating unit 402 determines whether the packet is sent from a legitimate server or not based on the determination on whether a unicast address registered in the anycast address correspondence table 411 (described later) corresponding to the anycast address set in the Hop-by-Hop option of the response packet matches with a unicast address set in the sender's address field of the IPv6 header of the response packet.

The validation information setting unit 403 sets the time of transfer of the response packet in the time field of the Hop-by-Hop option in the received response packet. The validation information setting unit 403 also generates an electronic signature with the use of a secret key for the Hop-by-Hop option in which the anycast address is set, and sets the generated electronic signature in the signature field.

Here, any known technique of electronic signature generation can be adopted. Identifier matching using a hash function, which is a unidirectional function, can be employed, for example, Message Digest #5 (MD5), Secure Hash Algorithm #1 (SHA-1) or the like. For example, a message digest may be generated from the entire Hop-by-Hop option including the anycast address with a hash function and a secret key 412. Then the message digest is set in the signature field as the electronic signature.

The transferring unit 404 performs processing to transfer the response packet in which the time is set in the time field and the electronic signature is set in the signature field in the Hop-by-Hop option to a next node.

The communication controlling unit 405 serves to generate a control signal to transmit/receive data to/from the router, the server, or the like, via the communication line, similarly to the communication controlling unit 206 in the servers A115a and B115b. In particular the communication controlling unit 405 corresponds to the network board, for example.

The storage unit 410 is a storage medium such as a hard disc drive (HDD), a random access memory (RAM), a flash memory, or the like, and stores the anycast address correspondence table 411 and the secret key 412.

The secret key 412 is commonly possessed by all the routers and the border router 130 in the first network, and maintained so that nodes other than all the routers and the border router 130 in the first network cannot know it. The secret key 412 is used at the generation of the electronic signature for the Hop-by-Hop option of the response packet.

The anycast address correspondence table 411 is a table which associates the anycast addresses allocated to the servers A115a and B115b in the first network with the unicast addresses of the servers A115a and B115b. The anycast address correspondence table 411 is referred to by the sender validating unit 402 and used for the validation on whether the anycast address set in the anycast field of the response packet is correct or not.

FIG. 5 is a schematic diagram of an example of the anycast address correspondence table 411. As shown in FIG. 5, the anycast address correspondence table 411 stores a list of unicast addresses of the serves to which the anycast address is allocated in association with the anycast addresses.

Figure 6:
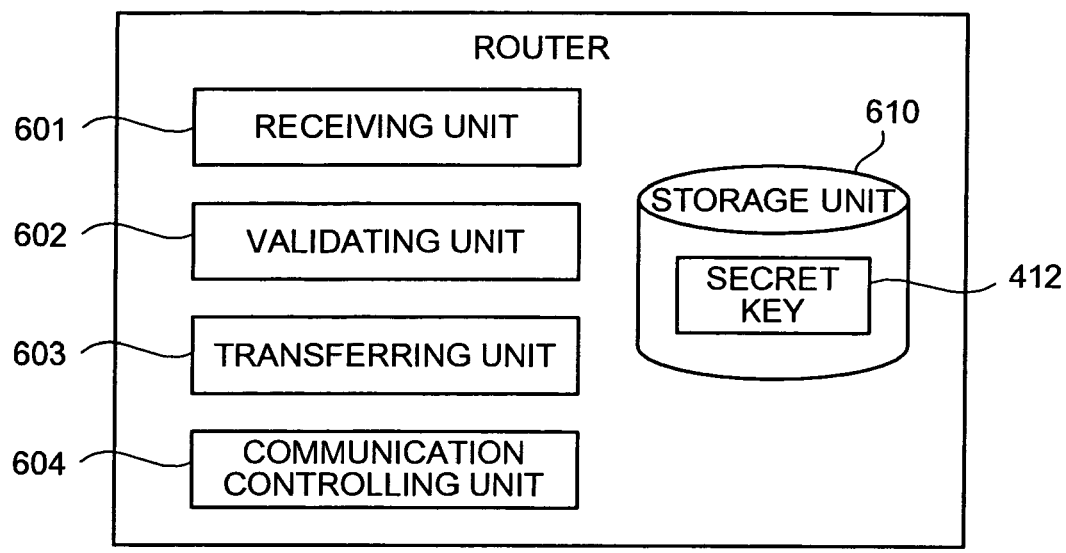
FIG. 6 is a block diagram of a schematic structure of a border router 130.

Next, the border router 130 is described. FIG. 6 is a block diagram of a schematic structure of the border router 130. The border router 130, as shown in FIG. 6, mainly includes a receiving unit 601, a validating unit 602, a transferring unit 603, a communication controlling unit 604, and a storage unit 610.

The receiving unit 601 is a processor which receives a packet sent from other elements in the network, such as the router A111, the router B112, the server A115a, and the server B115b. In the first embodiment, the receiving unit 601 receives the response packet sent from the routers A111 or B112 to the communication apparatus 121a, 121b, or 121c.

The validating unit 602 performs processing to determine whether the response packet is legitimate or not based on the determination on whether the time set in the time field of the Hop-by-Hop option of the received response packet is within a certain time period from the current time. Further, the validating unit 602 performs a processing to determine whether the response packet is legitimate or not based on the determination on whether the electronic signature set in the signature field of the Hop-by-Hop option of the received response packet is legitimate or not.

Here, the same technique of electronic signature generation employed for the router A111 and B112 is used. For example, if the technique using the hash function as described above is employed for the routers A111 and B112, a message digest is generated from the entire Hop-by-Hop option including the anycast address with the use of the hash function and the secret key 412, and determination is made on whether the message digest matches with the electronic signature in the signature field or not, whereby it is determined whether the electronic signature is legitimate or not.

The transferring unit 603 performs a processing to transfer the response packet to a next node when the response packet is determined to be legitimate by the validating unit 608.

Similarly to the communication controlling unit 206 and communication controlling unit 405 in the server A115a, the server B115b, the router A111, and the router B112, the communication controlling unit 604 serves to generate a control signal to transmit/receive data to/from the router, the server, or the like via the communication line, and in particular corresponds to the network board or the like.

The storage unit 610 is a storage medium such as a hard disc drive (HDD), a random access memory (RAM), a flash memory, and stores the secret key 412 which is same with the secret key stored by the routers A111 and B112. The secret key 412 is used by the validating unit 602 at the decoding of the electronic signature set in the signature field in the Hop-by-Hop option of the response packet.

Figure 7:
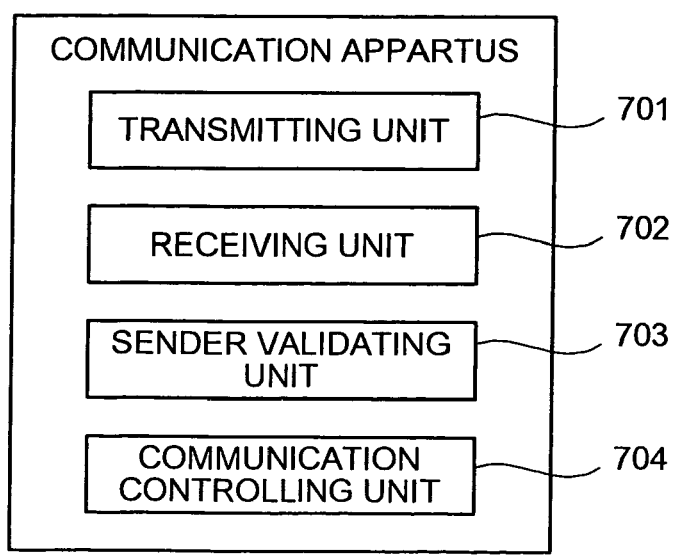
FIG. 7 is a block diagram of a schematic structure of communication apparatuses 121a, 121b, and 121c.

The communication apparatuses 121a, 121b, and 121c in the second network 120 are described. FIG. 7 is a block diagram of a schematic structure of the communication apparatuses 121a, 121b, and 121c.

The communication apparatuses 121a, 121b, and 121c, as shown in FIG. 7, each mainly include a transmitting unit 701, a receiving unit 702, a sender validating unit 703, and a communication controlling unit 704.

The transmitting unit 701 performs a processing to send a packet to a desired destination. In the first embodiment, the transmitting unit 701 sends an inquiry packet to the server A115a or the server B115b in the first network 110 using the anycast address.

The receiving unit 702 is a processor that receives a packet sent from the border router 130 via the internet 122.

The sender validating unit 703 performs a processing to validate whether the received response packet is sent from a legitimate server or not. Specifically, when the sender's address set in the sender's field of the IPv6 header of the received response packet does not match with the destination address of the inquiry packet, the sender validating unit 702 determines whether the Hop-by-Hop option of the response packet is an option related with the anycast address or not based on the value of the option. When the option is related with the anycast address, the sender validating unit 702 determines that the response packet is sent from the legitimate server.

The communication controlling unit 704, similarly to the communication controlling unit 206 and communication controlling unit 405 in the server A115a, the server B115b, the router A111, and the router B112, serves to generate a control signal to transmit/receive data to/from the router, the server or the like via the communication line, and in particular corresponds to the network board.

Next, described are a communication process and a routing process in the communication system according to the first embodiment with the above-described structure.

Figure 8:
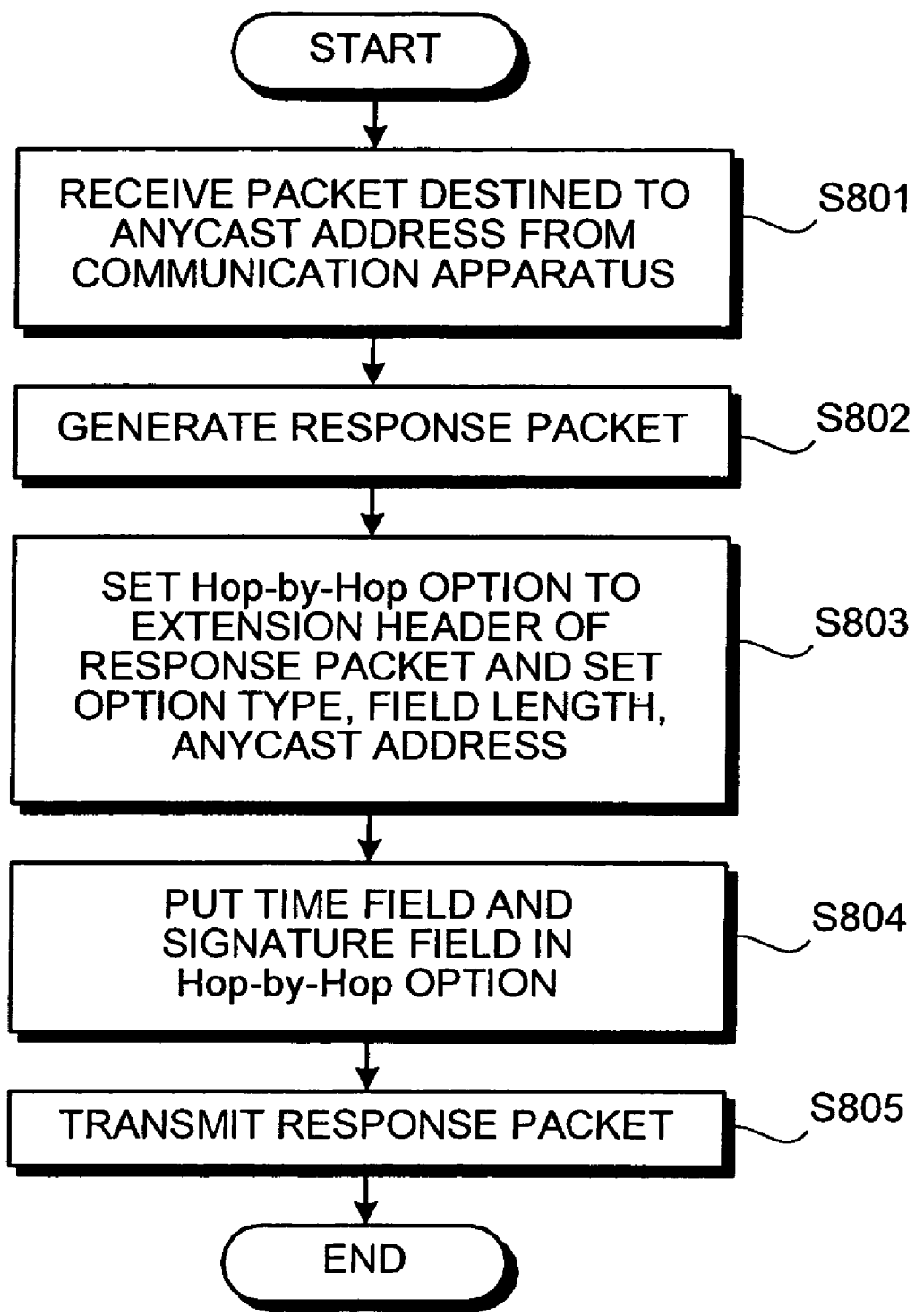
FIG. 8 is a flowchart of a communication process sequence of servers A115a and B115b.

First, the communication process by the servers A115a and B115b in the first network 110 is described. FIG. 8 is a flowchart of a communication process sequence by the servers A115a and B115b. Here, a description is given on a communication process carried out when the communication apparatus 121a sends an inquiry packet specifying an anycast address, and the sever A115a among the servers to which the anycast address is allocated receives the packet. It should be noted that the similar communication process is carried out as well when other communication apparatus 121b or 121c sends a packet and the server B115b receives the packet.

When the receiving unit 201 receives a packet destined for an anycast address from the communication apparatus 121a, 121b, or 121c via the internet 122 (step S801), the response packet generating unit 202 generates a response packet to start service provision in response to the inquiry packet (step S802). Here, a unicast address of the server A115a is set in the sender field in the IPv6 header of the response packet, and not the anycast address due to the restraint in IPv6. In the destination field of the IPv6 header of the response packet, the IP address of the communication apparatus 121a which sends the inquiry packet is set.

Then, the option setting unit 203 sets the Hop-by-Hop option in the extension header of the response packet generated in step S802 to set the option type and the field length as shown in FIG. 3, and sets the anycast address allocated to the server A115a in the anycast address field (step S803). Here, the anycast address is previously stored in a storage medium such as an HDD or a flash memory.

Then, the field putting unit 204 puts the time field and the signature field in the Hop-by-Hop option of the response packet (step S804). Here, a NULL value (0) is set in the time field and the signature field to indicate that they are blank boxes with no values set yet. Here, other values may be selected to indicate the blank box as far as a certain value is previously determined to indicate the blank box among the server A115a, the server B115b, the router A111, and the router B112, and such value may be set in the time field and the signature field.

When the anycast address is set in the Hop-by-Hop option of the response packet and the time field and the signature field are put, the transmitting unit 205 sends the response packet (step S805).

Thus, the anycast address is set in the Hop-by-Hop option of the response packet and the response packet in which the time field and the signature field are put is sent to a next node.

Figure 9:
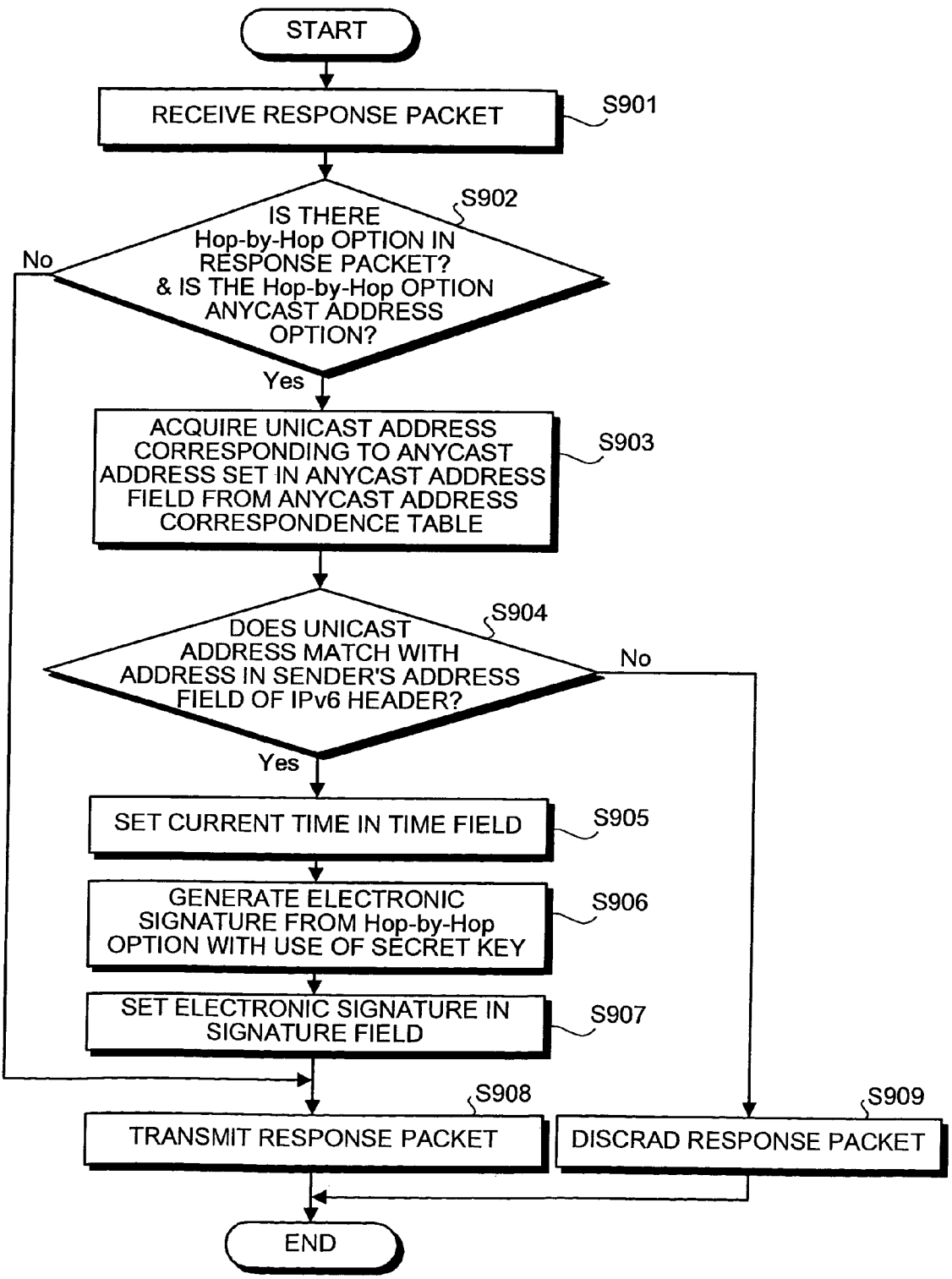
FIG. 9 is a flowchart of a routing process sequence of routers A111 and B112.

Next, the routing process by the routers A111 and B112 is described. FIG. 9 is a flowchart of the routing process sequence by the router A111 or B112. Here, description is given on a process where the response packet sent from the server A115a is transferred by the router A111. However, it should be noted that the similar process is performed when the server B115b sends a response packet which is transferred by the router B112.

First, the receiving unit 401 receives a response packet from the server A115a (step S901). Then the sender validating unit 402 determines whether the Hop-by-Hop option is inserted in the extension header of the received response packet or not, and if there is the Hop-by-Hop option, determines whether the option type is an anycast address option indicating that the sender server has an allocated anycast address (step S902). Specifically, when the Hop-by-Hop option shown in FIG. 3 is used, the sender validating unit 402 determines whether the set value set of the option type is "0x2f" or not. When the set value of the option type is "0x2f," the sender validating unit 402 determines that the Hop-by-Hop option is the anycast address option indicating that the sender server has an allocated anycast address.

When Hop-by-Hop option is not inserted in step S902 or the inserted Hop-by-Hop option is determined not to be the anycast address option (No in step S902), the sender validating unit 402 determines that the response packet is not from the apparatus to which the anycast address is allocated, and the transferring unit 404 sends the response packet as it is to a next node (step S908).

On the other hand, if the Hop-by-Hop option is inserted in the response packet, and is determined to be the anycast address option in step S902 (Yes in step S902), the sender validating unit 402 determines that the response packet is from the apparatus to which the anycast address is allocated. Then, the sender validating unit 402 acquires an anycast address set in the anycast address field of the Hop-by-Hop option and then acquires a unicast address corresponding to the acquired anycast address from the anycast address correspondence table 411 (step S903).

Then, the sender validating unit 402 determines whether the acquired unicast address matches with the unicast address set in the sender's address field in the IPv6 header of the response packet (step S904).

When the sender validating unit 402 determines that the unicast address acquired in step S903 does not match with the unicast address set in the sender's address field of the response packet (No in step S904), hence that the response packet is sent from a fake node, the sender validating unit 402 discards the response packet (step S909) and does not transmit the response packet.

On the other hand, if the sender validating unit 402 determines that the unicast address acquired in step S903 matches with the unicast address set in the sender's address field of the response packet (Yes in step S904), the sender validating unit 402 determines that the response packet is sent from the legitimate server A115a.

Then, the validation information setting unit 403 sets a current time in the time field of the Hop-by-Hop option of the response packet as a time of initial transfer (step S905).

Subsequently, the validation information setting unit 403 generates an electronic signature from the entire Hop-by-Hop option using the secret key 412 stored in the storage unit 410 (step S906). For example, when the technique of electronic signature generation using the hash function is being employed, the entire Hop-by-Hop option is hashed via the hash function with the use of the secret key 412, and the message digest is generated as an electronic signature.

Then, the electronic signature is set in the signature field of the Hop-by-Hop option of the response packet (step S907). Then the transmitting unit 404 transmits the response packet in which the current time and the electronic signature are set to a next node (step S908).

Thus, the router A111 sets the validation information, i.e., the current time (time of initial transfer) and the electronic signature, to the response packet received from the server A115a and transmits the same to the next node.

Here, the anycast address is not set in the sender's address field of the response packet sent from the server A115a. Hence, a node A' in the site of the first network 110 may set a unicast address of the node A' itself in the sender's address of the response packet impersonating the legitimate server A115a, and sends the packet to the communication apparatus 121a, for example. Even in such a case, since the node A' cannot set the anycast address option for the Hop-by-Hop option of the response packet, the anycast address is not set. Then, the router A111, on receiving such a illegitimate response packet made by impersonation, makes the sender validating unit 402 check the presence of the anycast address option and validate the anycast address. Thus, such a response packet is determined to be an illegitimate packet sent from an illegitimate node impersonating the legitimate server A115a and discarded, whereby the transfer of illegitimate packets impersonating the legitimate server 115a in the site can be prevented.

Figure 10:
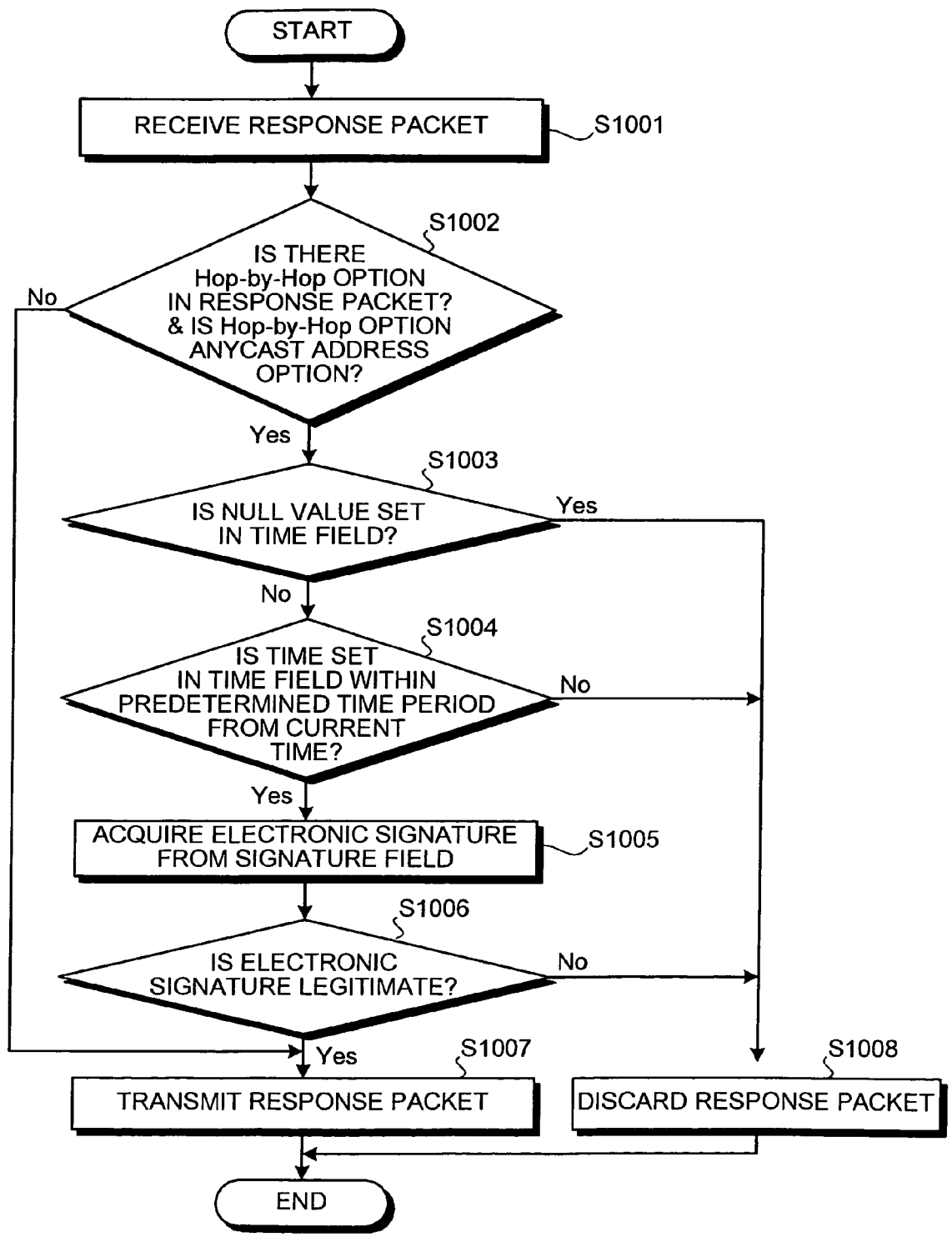
FIG. 10 is a flowchart of a routing process sequence of the border router 130.

Next, the routing process by the border router 130 is described. FIG. 10 is a flowchart of the routing process sequence by the border router 130. Here, a description is given on the transfer process where the response packet transmitted from the server A115a as described above is transferred to the border router 130 by the router A111, and the border router 130 transfers the response packet to the communication apparatus 121a. Similar process is performed when the server B115b transmits the response packet and the router B112 transfers the same.

First, the receiving unit 601 receives the response packet from the router A111 (step S1001). Then, the validating unit 602 determines whether the Hop-by-Hop option is inserted into the extension header of the received response packet or not, and if inserted, determines whether the option type of the Hop-by-Hop option is the anycast address option that indicates that the sender server has an allocated anycast address (step S1002). Specifically, similarly to the routing process by the router A111, when the Hop-by-Hop option shown in FIG. 3 is used, the validating unit 602 determines whether the set value of the option type is "0x2f" or not.

Then at step S1002, if the Hop-by-Hop option is not inserted into the extension header of the response packet or the inserted Hop-by-Hop option is determined not to be the anycast address option (No in step S1002), the validating unit 602 determines that the response packet is not sent from the apparatus which has an allocated anycast address, and the transferring unit 603 sends the response packet as it is to the communication apparatus 121a (step S1007).

On the other hand, in step S1002, if the Hop-by-Hop option is inserted into the extension header of the response packet and the inserted Hop-by-Hop option is determined to be the anycast address option (Yes in step S1002), the validating unit 602 determines that the response packet is sent from an apparatus which has an allocated anycast address.

The validating unit 602 then determines whether the NULL value is set in the time field of the Hop-by-Hop option of the response packet or not (step S1003). In the time field, a time of transfer must have been set by the router A111 that first transfers the response packet. Hence, when the NULL value is set in the time field (Yes in step S1003), the validating unit 602 determines that the response packet is likely to have been received and altered by a malicious third party during the transmission from the router 111 to the border router 130, and discards the response packet (step S1008).

On the other hand, if a time, not the NULL value, is set in the time field at step S1003 (No in step S1003), the validating unit 602 determines whether the set time is within a predetermined time period from the current time or not (step S1004). If the set time is not within the predetermined time period from the current time (No in step S1004), the validating unit 602 determines that excessively long time has passed since the initial transfer of the response packet until the reception by the border router 130, and hence, it is likely that the response packet is received by a malicious third party during the transmission from the router A111 to the border router 130, and the validating unit 602 discards the response packet (step S1008). Here, the predetermine time period mentioned above may be set, for example, to an average time required for the transfer of the packet from the router A111 to the border router 130. Thus, based on the transfer time of the packet, the packet which is received and transferred by a malicious node between the router A111 and the border router 130 is surely excluded from the transmission.

On the other hand, if the time set in the time field is within the predetermine time period from the current time in step S1004 (Yes in step S1004), the electronic signature set in the signature field is acquired (step S1005). In the signature field, stored is the electronic signature generated with the use of the secret key 412 for the entire Hop-by-Hop option by the router A111 that first transfers the response packet. The validating unit 602 validates if the acquired electronic signature is legitimate or not (step S1006).

For example, when the technique of electronic signature employed here is the one using the hash function as in the router A111 or the router B112, a message digest is generated from the entire Hop-by-Hop option with the hash function and the secret key 412. Then, the validating unit 602 determines whether the message digest matches with the electronic signature acquired from the signature field to validate the electronic signature.

When the electronic signature is determined not to be legitimate (No in step S1006), i.e., in an example as shown above, if the generated message digest does not match with the electronic signature in the signature field, the validating unit 602 determines that the response packet is likely to have eavesdropped and altered by a malicious third party during the transmission from the router A111 to the border router 130, and discards the response packet (step S1008).

On the other hand, when the electronic signature is determined to be legitimate in step S1006 (Yes in step S1006), i.e., in the example shown above, if the generated message digest matches with the electronic signature in the signature field, the validating unit 602 determines that the response packet is legitimate, in other words, that there is no possibility of eavesdropping or alteration, and sends the response packet to the communication apparatus 121a (step S1007).

Thus, the border router 130 determines the legitimacy of the response packet sent from the router A111 and transfers only the response packet determined to be legitimate to a next node.

When a node A" in the site of the first network 110 eavesdrops a legitimate response packet transmitted through a transfer route from the router A111 to the border router 130, alters the response packet and transfers the resulting packet to the border router 130, a time elapsed since the time (the time the packet is transferred from the router A111) set in the time field of the Hop-by-Hop option till the current time becomes longer than the predetermined time period. Thus, with the validation of the set time in the time field and the current time by the validating unit 602, the packet as described above is determined to be a packet which is likely to have been altered and discarded, whereby the transfer of the illegitimate response packet altered in the site can be prevented.

Further, since the router A111 determines whether the response packet is likely to have been altered or not based on the time set in the time field of the Hop-by-Hop option, the malicious node A" might transfer the altered response packet to the border router 130 after changing the time set in the time field of the eavesdropped response packet to the time of transfer from the node A".

However, since the electronic signature generated from the entire Hop-by-Hop option of the response packet by the secret key 412 is set in the signature field, and the Hop-by-Hop option also includes the time field, the alteration only of the time set in the time field does not results in the successful impersonation since the validation of the electronic signature in the Hop-by-Hop option which includes the time field ends in failure.

Therefore, even if the response packet with the altered time field is transferred to the border router 130, the border router 130 can determine that such response packet is illegitimate and discard the same via the validation of the electronic signature by the validating unit 602. Thus, the transfer of the altered illegitimate response packet in the site can be prevented.

Figure 11:
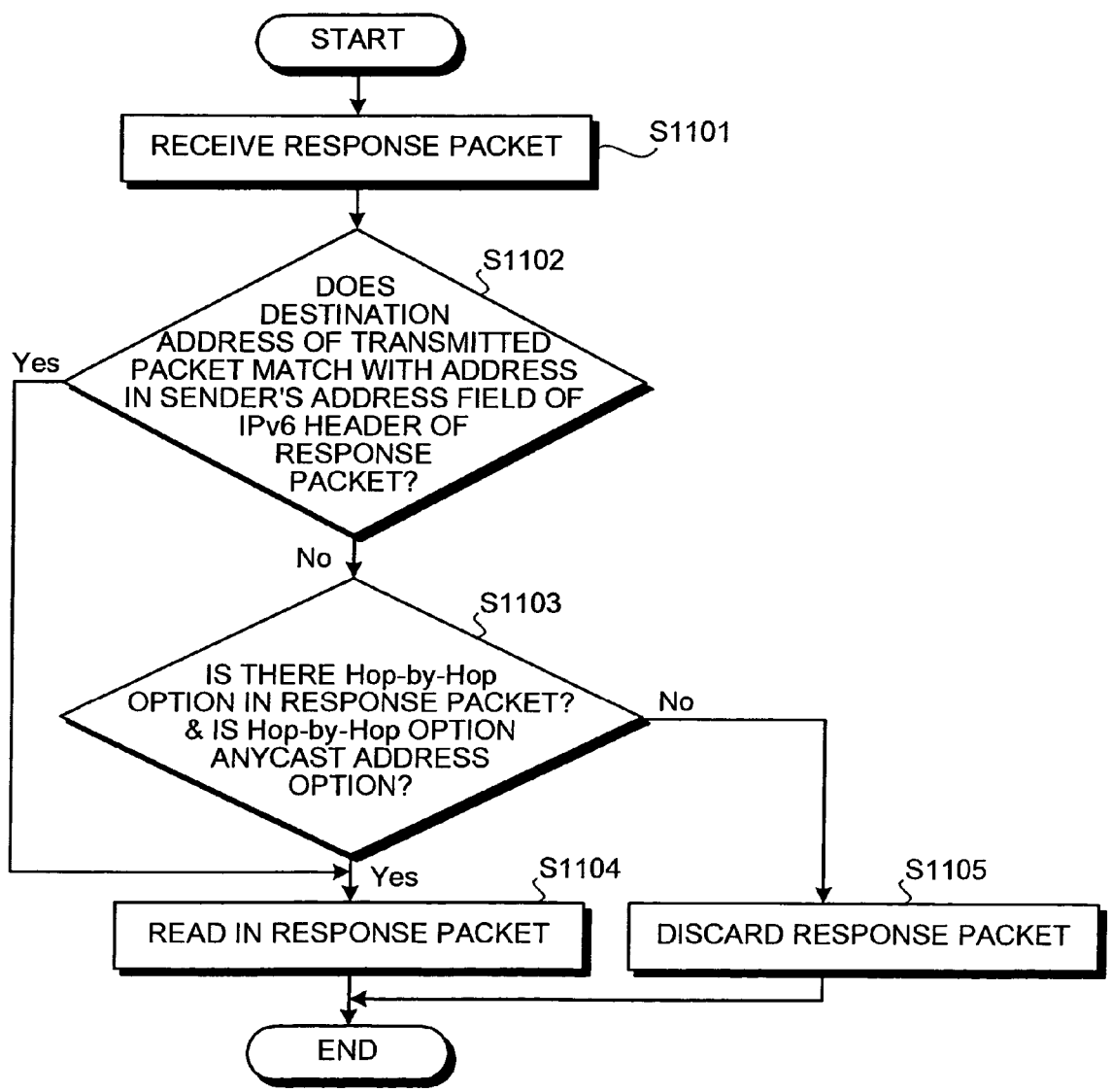
FIG. 11 is a flowchart of a routing process sequence of the communication apparatus 121a, 121b, and 121c.

The routing process by the communication apparatuses 121a, 121b, and 121c is described. FIG. 11 is a flowchart of the routing process sequence by the communication apparatuses 121a, 121b, and 121c. Here, a description is given on a routing process where: the communication apparatus 121a transmits the inquiry packet destined for the anycast address; the server A115a among the servers to which the anycast address is allocated receives the inquiry packet; and the server A115a transmits the response packet via the router A111 and the border router 130 to the communication apparatus 121a. The similar process is performed also in the routing for the transmission of the response packet from the server B115b via the router B112 and the border router 130, and when other communication apparatus 121b or 121c transmits the inquiry packet and receives the response packet.

First, the transmitting unit 701 transmits the inquiry packet destined for the anycast address. Then the server A115a among the servers to which the anycast address is allocated receives the inquiry packet. The server A115a sends back the response packet to the receiving unit 702 via the router A111 and the border router 130 (step S1101).

Then, the sender validating unit 703 determines whether the destination address of the inquiry packet matches with the address set in the sender's address field in the IPv6 header of the received response packet or not (step S1102).

Here, when the communication apparatus 121a sends a packet, the destination node sends back a response packet in which the unicast address of the destination node is set as the sender's address. The communication apparatus 121a can specify the destination address at the packet transmission either by the anycast address or the unicast address. When the packet is sent to the unicast address, the destination address of the inquiry packet matches with the sender's address of the response packet, whereas when the packet is sent to the anycast address, the destination address of the inquiry packet does not match with the sender's address of the response packet. To deal with such a case, the communication apparatus determines whether the received response packet is a response to the packet transmitted to the anycast address or to the packet transmitted to the unicast address at step S1102.

When the sender validating unit 703 determines that the addresses match with each other at step S1102 (Yes in step S1102), the received response packet is a response to the inquiry packet destined for the unicast address. Hence, the communication apparatus does not perform the validating process for the response packet to the inquiry packet destined for the anycast address (step S1103) and reads in the response packet (step S1104).

When the sender validating unit 703 determines that the addresses do not match with each other at step S1102 (No in step S1102), the received response packet is a response to the packet destined for the anycast address. Then, the sender validating unit 703 determines whether the Hop-by-Hop option is inserted in the extension header of the received response packet or not, and if the Hop-by-Hop option is inserted, determines whether the option type of the Hop-by-Hop option is the anycast address option which indicates that the anycast address is allocated to the sender server or not (step S1103). Specifically, similarly to the routing process by the router A111 and the border router 130, the sender validating unit 703 determines whether the set value of the option type is "0x2f" or not when the Hop-by-Hop option as shown in FIG. 3 is employed.

Then, in step S1103, when the sender validating unit 703 determines that the Hop-by-Hop option is not inserted into the extension header of the response packet or that the inserted Hop-by-Hop option is not an anycast address option (No in step S1103), the sender validating unit 703 determines that the received packet is sent from an illegitimate node and discards the received response packet (step S1105).

On the other hand, in step S1103, when the sender validating unit 703 determines that the Hop-by-Hop option is inserted in the extension header of the response packet, and the inserted Hop-by-Hop option is an anycast address option (Yes in step S1103), the sender validating unit 703 determines that the received packet is sent from a legitimate apparatus to which the anycast address is allocated, and not an illegitimate packet sent from a node impersonating the server A115a, and reads in the received response packet (step S1104).

Here, the anycast address is not set in the sender's address field of the response packet sent from the server 115a. Assume that the node A' in the site of the first network 110 impersonates the legitimate server A115a, sets the unicast address of the node A' itself in the sender's address of the response packet, and transfers the resulting packet to the communication apparatus 121a. Even then, the node A' cannot set the anycast address option in the Hop-by-Hop option of the response packet. Therefore, the communication apparatus 121a which receives the illegitimate response packet generated through the impersonation can check the presence of the anycast address option with the sender validating unit 703, determines that such packet is an illegitimate packet sent from the illegitimate node impersonating the legitimate server A115a, and discard such a packet. Thus, it is possible to prevent the transfer of an illegitimate packet generated by a fake node impersonating the legitimate server A115a in the site of the first network 110.

Here, the communication apparatuses 121a, 121b, and 121c cannot check the set information to confirm whether each router in the first network 110 has verified the response packet before transmission or not. Hence, even though the communication apparatus 121a, 121b, or 121c determines that the Hop-by-Hop option is inserted in the received packet and the Hop-by-Hop option is the anycast address option, this determination alone does not guarantee that the response packet has been correctly validated and filtered at each router.

However, it should be noted that in the environment where the detection is not performed by each router, the attack via impersonation is possible even when the unicast address is employed. In the first embodiment, the security can be guaranteed at an equal level both in the case where the reception of the response packet to the packet destined for the anycast address is intended and in the case where the reception of the response packet to the packet destined for the unicast address is intended, provided that the filtering is performed by each router in the site of the first network.

In the communication system according to the first embodiment, since the communication apparatus checks whether the Hop-by-Hop option of the response packet is the anycast address option that indicates that the packet is sent from the apparatus to which the anycast address is allocated, and validates the anycast address set in the Hop-by-Hop option, thereby determining whether the response packet is sent from the legitimate server 115a or 115b or not, the attack by an illegitimate packet generated by a fake node impersonating the legitimate server 115a in the site can be prevented.

Further, in the communication system according to the first embodiment, since the communication apparatus validates the electronic signature in the Hop-by-Hop option in the response packet, the attack by an illegitimate packet generated by alteration in the site can be prevented.

In the first embodiment, the validation of the time and the electronic signature set in the Hop-by-Hop option of the response packet is performed only by the border router 130. If there is a router which performs a second and subsequent transfer of the response packet transmitted from the server A115a or B115b, i.e., a router as a next node to the router A111 exists, such router may perform the validation of the time and the electronic signature.

Further in the first embodiment, the border router 130 validates only the time and the electronic signature and does not perform the validation based on the anycast address set in the Hop-by-Hop option in the response packet. However, the validation based on the anycast address may be performed to allow more secure prevention of the attack by impersonation.

Next, a communication system according to a second embodiment is described.

In the communication system according to the first embodiment, the router A111 first transfers the response packet from the server A115a validating the legitimacy of the sender based on the anycast address set in the Hop-by-Hop option thereby set the validation information in the signature field and the time field, and the border router 130 performs the second or subsequent transfer of the response packet validating whether the response packet has been altered or not based on the time of transfer and the electronic signature set in the Hop-by-Hop option by the router A111. In the communication system according to the second embodiment, all the routers in the first network 110 have the functions to validate the legitimacy of the sender based on the anycast address, to set the validation information in the signature field and the time field, and to validate whether the response packet has been altered or not based on the time of transfer and the electronic signature. Decision on which functions are to be performed is made based on the number of the response packet transfer, i.e., whether it is the first transfer or the second and subsequent transfer.

The network structure of the communication system according to the second embodiment is similar to the network structure of the first embodiment shown in FIG. 1.

Figure 12:
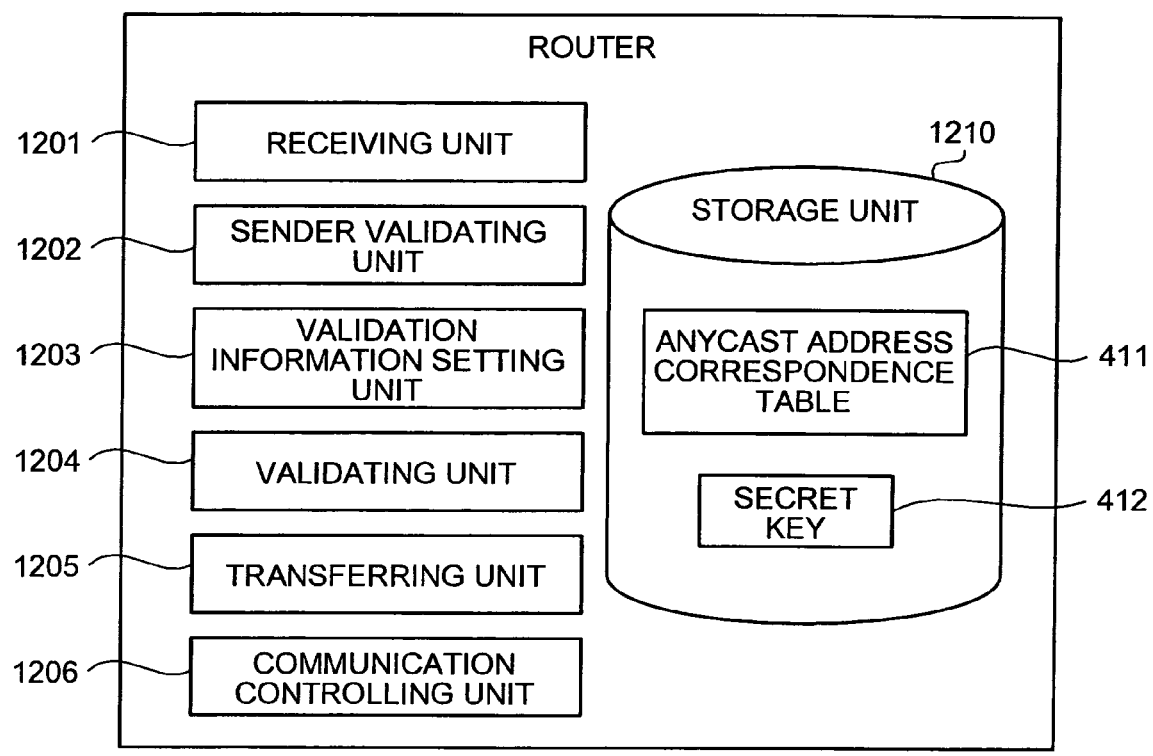
FIG. 12 is a block diagram of a schematic structure of routers A111 and B112, and a border router 130 according to a second embodiment.

In the second embodiment, the router A111, the router B112, and the border router 130 have the same schematic structure. FIG. 12 is a block diagram of the schematic structure of the router A111, the router B112, and the border router 130 according to the second embodiment.

As shown in FIG. 12, the router A111, the router B112, and the border router 130 according to the second embodiment mainly includes a receiving unit 1201, a sender validating unit 1202, a validation information setting unit 1203, a validating unit 1204, a transferring unit 1205, a communication controlling unit 1206, and a storage unit 1210.

The receiving unit 1201 is a processor that receives a packet transmitted from other apparatus, such as the server A115a, the server B115b, other router, or the like in the network. In the second embodiment, the response packet sent from the server A115a or B115b to the communication apparatus 121a, 121b, or 121c is received directly or via other router.

The sender validating unit 1202 at a first transfer of the received response packet performs a process to validate whether the response packet is sent from the legitimate server or not similarly to the routers A111 and B112 of the first embodiment. Specifically, the sender validating unit 1202 determines whether the response packet is a packet sent from the legitimate server or not based on the determination on whether the unicast address registered in the anycast correspondence table 411 in correspondence with the anycast address set in the Hop-by-Hop option of the response packet matches with the unicast address set in the sender's address field of the IPv6 header of the response packet or not, similarly to the routers A111 and B112 of the first embodiment.

The validation information setting unit 1203 at the first transfer of the receive response packet performs a process to set the time of transfer of the response packet in the time field of the Hop-by-Hop option of the received response packet, generate the electronic signature with the use of the secret key based on the Hop-by-Hop option where the anycast address is set, and set the generated electronic signature in the signature field similarly to the routers A111 and B112 of the first embodiment.

The validating unit 1204 at a second and subsequent transfer of the response packet performs a process to determine whether the response packet is legitimate or not based on the determination on whether the time set in the time field of the Hop-by-Hop option of the received response packet is within a predetermined time period from the current time or not similarly to the border router 130 of the first embodiment. Further, the validating unit 1204 performs a process to determine whether the response packet is legitimate or not based on the determination on the legitimacy of the electronic signature set in the signature field of the Hop-by-Hop option of the received response packet. The transmitting unit 1205 performs a process to transfer the response packet to a next node.

The communication controlling unit 1206 serves to generate a control signal to transmit/receive data to/from the router, the server, or the like via the communication line similarly to a corresponding unit in the first embodiment, and specifically corresponds to the network board or the like.

The storage unit 1210 is a storage medium such as a hard disc drive (HDD), a random access memory (RAM), a flash memory, or the like, and stores the secret key 412 which is common to the routers A111 and B112, and the border router 130 in the first network 110, and the anycast address correspondence table 411. Here, the secret key 412 and the anycast address correspondence table 411 are similar to the secret key 412 and the anycast address correspondence table 411 described with reference to the first embodiment.

Figure 13:
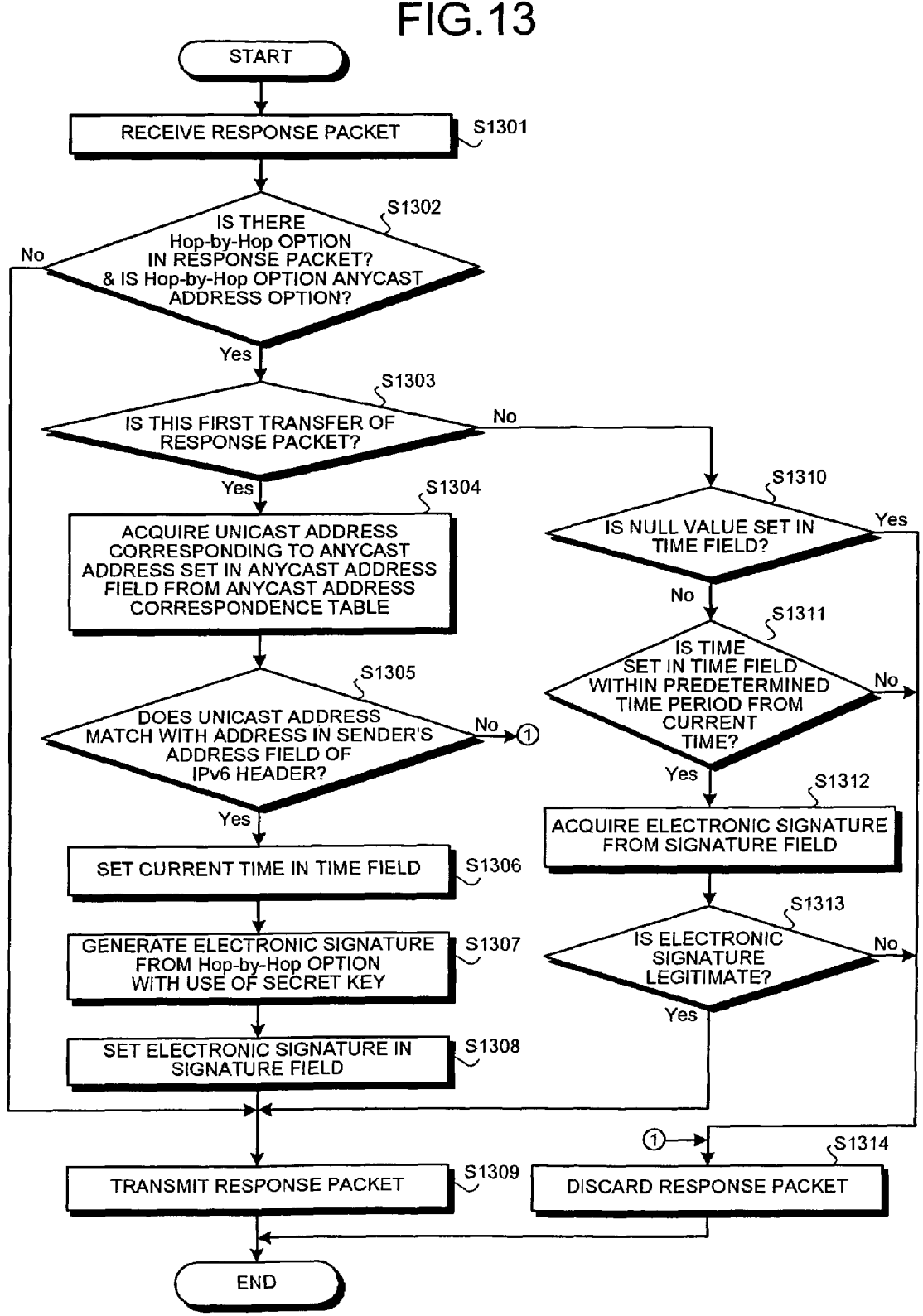
FIG. 13 is a flowchart of a routing process sequence of the routers A111 and B112, and the border router 130 according to the second embodiment.

The routing process by the router A111, the router B112, and the border router 130 according to the second embodiment is described. Here, the transmission process of the response packet by the server A115a or B115b which receives the inquiry packet destined for the anycast address from the communication apparatus 121a, 121b, or 121c is performed in the same manner as in the first embodiment. FIG. 13 is a flowchart of the routing process sequence by the router A111, the router B112, and the border router 130 according to the second embodiment.

First, the receiving unit 1201 receives the response packet from a previous node (step S1301). Then, the sender validating unit 1202 determines whether the Hop-by-Hop option is inserted into the extension header of the received response packet or not, and if the Hop-by-Hop option is inserted, determines whether the option type of the Hop-by-Hop option is the anycast address option which indicates that the anycast address is allocated to the sender server (step S1302). Specifically, when the Hop-by-Hop option shown in FIG. 3 is used, the validating unit 1202 determines whether the set value of the option type is "0x2f" or not. Here, when the set value of the option type is "0x2f," the sender validating unit 1202 determines that the Hop-by-Hop option is the anycast address option which indicates that the anycast address is allocated to the sender server.

Then, in step S1302, when the sender validating unit 1202 determines that the Hop-by-Hop option is not inserted or the inserted Hop-by-Hop option is not the anycast address option (No in step S1302), the sender validating unit 1202 determines that the response packet is not sent form the apparatus to which the anycast address is allocated, and the transferring unit 1205 transmits the response packet as it is to the next node (step S1309).

On the other hand, in step S1302, when the sender validating unit 1202 determines that the Hop-by-Hop option is inserted into the response packet and that the Hop-by-Hop option is the anycast address option (Yes in step S1302), the sender validating unit 1202 determines that the response packet is sent from the apparatus to which the anycast address is allocated. Then the validating unit 1204 determines whether the response packet is transferred at this node for the first time or not (step S1303). For example if this is the first node which transfers the response packet, nothing should have been set in the signature field and the time field of the Hop-by-Hop option of the response packet. The validating unit 1204 determines whether this is the first transfer of the response packet or not based on the determination on whether the NULL value indicating the blank is set both in the signature field and the time field.

The values in the signature field and the time field are set by the router A111 or the router B112 that transfers the response packet for the first time. Hence, if the NULL value indicating the blank is set in these fields, the router that receives the response packet is the first node to transfer the response packet. In the second embodiment, both the signature field and the time field are checked if NULL values are set, for the determination on whether it is the first time the response packet is to be transferred or not. However, this is not a limiting example. For example, a flag or the like may be inserted into the Hop-by-Hop option to indicate an initial transfer or not, to allow each router to determine whether it is the first node to transfer the response packet.

Then in step S1303, when the validating unit 1204 determines that this is the first node to transfer the response packet (Yes in step S1303), the sender validating unit 1202 acquires the anycast address set in the anycast address field of the Hop-by-Hop option and acquires the unicast address corresponding to the acquired anycast address from the anycast address correspondence table 411 (step S1304).

Then, the sender validating unit 1202 determines whether the acquired unicast address matches with the unicast address set in the sender's address field of the IPv6 header of the response packet (step S1305).

When the sender validating unit 1202 determines that the unicast address acquired in step S1304 does not match with the unicast address set in the sender's address field of the response packet (No in step S1305), the sender validating unit 1202 determines that the response packet is sent from an illegitimate node and discards the packet (step S1314) without performing the transmission of the response packet.

On the other hand, in step S1305, when the sender validating unit 1202 determines that the unicast address acquired in step S1304 matches with the unicast address set in the sender's address field of the response packet (Yes in step S1305), the sender validating unit 1202 determines that the response packet is sent from the legitimate server A115a.

Then, the validation information setting unit 1203 sets the current time as a time of initial transfer in the time field of the Hop-by-Hop option of the response packet (step S1306).

Then, the validation information setting unit 1203 generates the electronic signature using the secret key 412 stored in the storage unit 410 from the entire Hop-by-Hop option (step S1307). Then, the validation information setting unit 1203 sets the generated electronic signature in the Hop-by-Hop option of the response packet (step S1308), and the transferring unit 1205 transfers the response packet in which the current time and the electronic signature are set to the next node (step S1309).

Thus, at the first transmission of a response packet, the router sets the validation information, i.e., the current time (time of the first transfer) and the electronic signature in the response packet received from the server A115a and transfers the resulting packet to the next node.

On the other hand, when the router determines that it is not the first router to transfer the response packet and a router of a second or subsequent transfer in step S1303 (No in step S1303), the validating unit 1204 determines whether the NULL value is set in the time field of the Hop-by-Hop option of the response packet (step S1310). In the time field the time of transfer should have been set by the router A111 which first transfers the response packet. When the NULL value is set in the time field (Yes in step S1310), the validating unit 1204 determines that the response packet is likely to have been eavesdropped and altered by a malicious third party during the transmission from the router A111 and discards the response packet (step S1314).

On the other hand, in step S1310, when a time instead of the NULL value is set in the time field, (No in step S1310), the validating unit 1204 determines whether the set time is within a predetermined time period from the current time or not (step S1311). When the validating unit 1204 determines that the set time is not within the predetermined time period from the current time (No. in step S1311), the validating unit 1204 determines that unnecessarily long time has elapsed since the time of first transfer of the response packet until it reaches to the router, and that the response packet is likely to have been eavesdropped by a malicious third party during the transmission from the router A111 to itself, and discards the response packet (step S1314). Here, the predetermined time period mentioned above, similarly to the first embodiment, may be set to an average of time required for the transfer of a packet from the router A111 to the pertinent router.

On the other hand, in step S1311, when the set time in the time field is within the predetermined time period from the current time (Yes in step S1311), the validating unit 1202 acquires the electronic signature set in the signature field (step S1312), and validates whether the acquired electronic signature is legitimate or not (step S1313). In the signature field, the electronic signature is stored. The stored electronic signature is generated from the entire Hop-by-Hop option with the use of the secret key 412 by the router A111 which transfers the response packet for the first time.

When the validating unit 1202 determines that the electronic signature is not legitimate (No in step S1313), the validating unit 1202 determines that the response packet is likely to have been eavesdropped and altered by a malicious third party during the transmission from the router A111 to the pertinent router, and discards the response packet (step S1314).

On the other hand, in step S1313, when the validating unit 1202 determines that the electronic signature is legitimate (Yes in step S1313), the validating unit 1202 determines that there is no likelihood of eavesdropping nor alteration and the response packet is legitimate, and sends the response packet to the next node (step S1309).

Thus, the router determines the legitimacy of the response packet received from the server A115a and the router A111, and if the response packet is legitimate, transfers the response packet to the next node.

Thus, in the communication system according to the second embodiment, the router validates the option type of the Hop-by-Hop option to check whether it is the anycast address option indicating that the response packet is sent from an apparatus with the anycast address or not, and further validates the anycast address set in the Hop-by-Hop option, thereby determining whether the response packet is sent from the legitimate servers A115a and B115b. Therefore, the attacks by illegitimate packets generated by a fake node impersonating the legitimate server A115a in the site can be prevented.

Further, in the communication system according to the second embodiment, the time and the electronic signature set in the Hop-by-Hop option of the response packet are validated, whereby the attack by an illegitimate response packet which is altered in the site can be prevented.

Further, in the communication system according to the second embodiment, all the routers in the first network 110 have the function to validate the legitimacy of the sender based on the anycast address, to set the validation information in the signature field and the time field, and to check if the response packet is altered or not based on the time of transfer and the electronic signature. The functions to be performed are chosen depending on whether the response packet is transferred for the first time or not. Thus, it is not necessary to divide and allocate functions to different routers to validate the legitimacy of the sender based on the anycast address, to set the validation information in the signature field and the time field, and to check if the response packet is altered or not based on the time of transfer and the electronic signature. Hence, the communication system can readily be built.

The servers A115a, B115b, the routers A111, B112, the border router 130, the communication apparatuses 121a, 121b, and 121c in the first and the second embodiments are built as a hardware using an ordinary computer and each include a controller such as a central processing unit (CPU), a storage such as a read only memory (ROM), a random access memory (RAM), an external storage such as a hard disc drive (HDD), a compact disc (CD) drive, a display such as a display monitor, and an input device such as a keyboard or a mouse.

The communication program to be executed by the servers A115a and B115b, the routing program to be executed by the routers A111 and B112, and the border router 130, the communication program to be executed by the communication apparatuses 121a, 121b, and 121c in the first and the second embodiments are recorded in an installable or an executable format file and provided in the form of a computer-readable recording medium such as a CD-ROM, a flexible disc (FD), a CD-R, digital versatile disk (DVD), or the like.

The communication program to be executed by the servers A115a and B115b, the routing program to be executed by the routers A111 and B112, and the border router 130, the communication program to be executed by the communication apparatuses 121a, 121b, and 121c may be stored in a computer connected to a network such as the Internet, and the above mentioned program may be downloaded via the network. Further, the communication program to be executed by the servers A115a and B115b, the routing program to be executed by the routers A111 and B112, and the border router 130, the communication program to be executed by the communication apparatuses 121a, 121b, and 121c may be provided or distributed via a network such as the Internet.

Further, the communication program to be executed by the servers A115a and B115b, the routing program to be executed by the routers A111 and B112, and the border router 130, the communication program to be executed by the communication apparatuses 121a, 121b, and 121c may be embedded in an ROM or the like in advance.

The communication program to be executed by the servers A115a and B115b, the routing program to be executed by the routers A111 and B112, and the border router 130, the communication program to be executed by the communication apparatuses 121a, 121b, and 121c according to the first and the second embodiments are structured as a module including respective components as mentioned above (receiving unit, sender validating unit, validation information setting unit, validating unit, transferring unit, transmitting unit). In an actual hardware, the CPU (processor) reads out the respective programs from the recording medium as mentioned above and executes the same, whereby the respective components are loaded on a main memory so that the receiving unit, the sender validating unit, the validation information setting unit, the validating unit, the transferring unit, and the transmitting unit are generated on the main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication system, comprising:
a server connected to a first network; and
a router connected to the first network, wherein the server includes
an option setting unit that grants to a response packet that is a response to a packet which is destined for an anycast address and which is sent from a communication apparatus connected to a second network different from the first network, anycast address option information which indicates that an anycast address is allocated to a sender of the response packet;

a field putting unit that puts a signature field for a setting of an electronic signature in the response packet; and a transmitting unit that transmits to the communication apparatus the response packet in which the anycast address option information has been set and the signature field has been put; and the router includes a receiving unit that receives the response packet sent from the server to the communication apparatus;

a sender validating unit that validates whether the response packet is sent from a legitimate server based on the anycast address option information if the response packet includes the anycast address option information;

a validation information setting unit that sets an electronic signature based on information related with the response packet in the signature field put in the response packet, when the response packet is validated to be sent from the legitimate server; and a transferring unit that transmits the response packet in which the electronic signature has been set.

2. The communication system according to claim 1, wherein the field putting unit further puts a time field in the response packet, and the validation information setting unit further sets a time of transfer of the response packet in the time field of the response packet.

3. The communication system according to claim 2, wherein the validation information setting unit sets the electronic signature using a predetermined key information for the anycast address option information in the signature field of the response packet.

4. The communication system according to claim 2, wherein the field putting unit puts the signature field and the time field in a field of the anycast address option information.

5. The communication system according to claim 1, wherein the option setting unit sets an anycast address allocated to the server in the anycast address option information of the response packet, and the router further includes a storage unit that stores anycast address correspondence information which includes a unicast address of the server that is present in the first network and the anycast address allocated to the server in association with each other, the sender validating unit, when the response packet includes the anycast address option information, determines whether the anycast address of the anycast address option information matches with a unicast address corresponding to the anycast address registered in the anycast address correspondence information, and when the anycast address matches with the unicast address, determines that the response packet is sent from a legitimate server.

6. A router comprising:

a receiving unit that receives a response packet from a server connected to a first network to a communication apparatus connected to a second network different from the first network, the response packet being a response to a packet destined for an anycast address which is sent from the communication apparatus and which is received by the server;

a sender validating unit that validates whether the response packet is sent from a legitimate server based on anycast address option information which indicates that an anycast address is allocated to a sender of the response packet if the response packet includes the anycast address option information;

a validation information setting unit that, when the response packet is validated to be sent from the legitimate server, sets an electronic signature based on information related with the response packet in the signature field put in the response packet; and a transferring unit that transfers the response packet in which the electronic signature is set to a next node.

7. The router according to claim 6, wherein the validation information setting unit further sets a time of transfer of the response packet in a time field put in the response packet by the server.

8. The router according to claim 6, wherein the validation information setting unit sets the electronic signature using a predetermined key information for the anycast address option information in the signature field of the response packet.

9. The router according to claim 6, wherein the sender validating unit validates, when the received response packet is to be transferred to another node for the first time, whether the response packet is sent from a legitimate server based on the anycast address option information if the response packet includes the anycast address option information, and discards the response packet if determines that the response packet is not sent from a legitimate server; and the router further comprises a validating unit that validates, when the response packet is sent from a node that transfers the response packet for the first time, whether the response packet is legitimate based on the electronic signature, and if the response packet is not legitimate, discards the response packet.

10. A communication method, comprising:

in a server connected to a first network, granting to a response packet that is a response to a packet which is destined for an anycast address and which is sent from a communication apparatus connected to a second network different from the first network, anycast address option information which indicates that an anycast address is allocated to a sender of the response packet;

in the server, putting a signature field for a setting of an electronic signature in the response packet;

in the server, transmitting to the communication apparatus the response packet in which the anycast address option information has been set and the signature field has been put;

in a router connected to the first network, receiving the response packet sent from the server to the communication apparatus;

in the router, validating whether the response packet is sent from a legitimate server based on the anycast address option information if the response packet includes the anycast address-option information;

in the router, setting an electronic signature based on information related with the response packet in the signature field put in the response packet, when the response packet is validated to be sent from the legitimate server; and in the router, transferring the response packet in which the electronic signature has been set.

11. A routing method comprising:

receiving a response packet from a server connected to a first network to a communication apparatus connected to a second network different from the first network, the response packet being a response to a packet destined for an anycast address which is sent from the communication apparatus and which is received by the server;

determining whether the received response packet includes anycast address option information which indicates that an anycast address is allocated to a sender of the response packet;

if the response packet includes the anycast address option information, validating whether the response packet is sent from a legitimate server based on the anycast address option information;

setting an electronic signature based on information related with the response packet in the signature field put in the response packet, when the response packet is validated to be sent from the legitimate server; and transferring the response packet in which the electronic signature is set to a next node.

12. The routing method according to claim 11, further comprising setting a time of transfer of the response packet in the time field of the response packet.

13. The routing method according to claim 11, further comprising setting the electronic signature using a predetermined key information for the anycast address option information in the signature field of the response packet.

14. The routing method to claim 11, further comprising:

determining, when the received response packet is to be transferred to another node for the first time, whether the response packet includes the anycast address option information;

if the response packet includes the anycast address option information, validating whether the response packet is sent from a legitimate server based on the anycast address option information; and discarding the response packet, when the response packet is determined not to be sent from a legitimate server;

validating, if the response packet is sent from a node that transfers the response packet for the first time, whether the response packet is legitimate based on the electronic signature; and if the response packet is not legitimate, discarding the response packet.

15. A computer program product having a computer readable medium including programmed instructions for transmitting a packet between a server and a router which are connected to a first network, wherein the instructions, when executed by a computer, cause the computer to perform:

granting to a response packet that is a response to a packet which is destined for an anycast address and which is sent from a communication apparatus connected to a second network different from the first network, anycast address option information which indicates that an anycast address is allocated to a sender of the response packet;

putting a signature field for a setting of an electronic signature in the response packet; and transmitting to the communication apparatus the response packet in which the anycast address option information has been set and the signature field has been put.

16. A computer program product having a computer readable medium including programmed instructions for transferring a packet sent from a server connected to a first network, wherein the instructions, when executed by a computer, cause the computer to perform:

receiving a response packet from the server, the response packet being a response to a packet destined for an anycast address which is sent from a communication apparatus connected to a second network different from the first network and which is received by the server;

determining whether the received response packet includes anycast address option information which indicates that an anycast address is allocated to a sender of the response packet;

if the response packet includes the anycast address option information, validating whether the response packet is sent from a legitimate server based on the anycast address option information;

setting an electronic signature based on information related with the response packet in the signature field put in the response packet, when the response packet is validated to be sent from the legitimate server; and transferring the response packet in which the electronic signature is set to a next node.

17. The computer program product according to claim 16, wherein the instructions further cause the computer to perform setting a time of transfer of the response packet in the time field of the response packet.

18. The computer program product according to claim 16, wherein the instructions further cause the computer to perform setting the electronic signature using a predetermined key information for the anycast address option information in the signature field of the response packet.

19. The computer program product according to claim 16, wherein the instructions further cause the computer to perform:

determining, when the received response packet is to be transferred to another node for the first time, whether the response packet includes the anycast address option information;

if the response packet includes the anycast address option information, validating whether the response packet is sent from a legitimate server based on the anycast address option information; and discarding the response packet, when the response packet is validated not to be sent from a legitimate server;

validating, if the response packet is sent from a node that transfers the response packet for the first time, whether the response packet is legitimate based on the electronic signature; and if the response packet is not legitimate, discarding the response packet.

* * * * *